United States Patent
Katakura et al.

[11] Patent Number: 6,148,257
[45] Date of Patent: Nov. 14, 2000

[54] VEHICLE DRIVE FORCE CONTROLLER

[75] Inventors: Shusaka Katakura; Masayuki Yasuoka; Nobusuke Toukura; Shojiro Sato; Yoshinori Iwasaki; Katsuhiko Tsuchiya; Hideaki Watanabe, all of Kanagawa, Japan

[73] Assignee: Nissan Motor Co., Ltd., Yokohoma, Japan

[21] Appl. No.: 09/149,218

[22] Filed: Sep. 8, 1998

[30] Foreign Application Priority Data

Sep. 8, 1997 [JP] Japan .................................. 9-242949

[51] Int. Cl.$^7$ ........................................ G06F 7/70
[52] U.S. Cl. ............................. 701/54; 701/51; 701/58; 701/53; 477/37; 477/43
[58] Field of Search .................. 701/54, 51, 53, 701/58, 60, 61, 55; 477/43, 46, 47, 78, 30, 125, 108, 45, 48, 120, 40, 37, 90, 91, 115; 123/361, 399, 419, 481

[56] References Cited

U.S. PATENT DOCUMENTS

| | | | |
|---|---|---|---|
| 4,658,360 | 4/1987 | Osamai et al. | 701/62 |
| 4,893,526 | 1/1990 | Tokoro | 477/43 |
| 5,597,371 | 1/1997 | Toukura | 477/111 |
| 5,605,131 | 2/1997 | Ohno et al. | 123/399 |
| 5,722,500 | 3/1998 | Toukura et al. | 477/47 |
| 5,730,680 | 3/1998 | Toukura | 477/46 |
| 5,749,804 | 5/1998 | Toukura | 477/47 |
| 5,938,712 | 8/1999 | Ibamoto et al. | 701/54 |

FOREIGN PATENT DOCUMENTS 7-172217  7/1995  Japan .

Primary Examiner—Jacques H. Louis-Jacques
Attorney, Agent, or Firm—Foley & Lardner

[57] ABSTRACT

In a vehicle equipped with a continuously variable transmission, sensors detect a vehicle speed, an accelerator depression degree and an output rotation speed of the transmission. The minimum required drive shaft drive torque is calculated from the vehicle speed and the accelerator depression degree. A target input rotation speed of the transmission for achieving the minimum required drive shaft drive torque with the least engine fuel consumption is calculated according to the vehicle speed. The input rotation speed is controlled to this target input rotation speed. The target engine output torque to generate the minimum required drive shaft drive torque is calculated, and an engine throttle opening is controlled to obtain this torque. As a result, the required vehicle drive force is obtained with the minimum engine fuel consumption.

9 Claims, 14 Drawing Sheets

VEHICLE DRIVE FORCE CONTROLLER

The contents of Tokugan Hei 9-242949, with a filing date of Sep. 8, 1997 in Japan, are hereby incorporated by reference.

FIELD OF THE INVENTION

This invention relates to control of drive force to economize fuel consumption of a vehicle in which a continuously variable transmission is installed.

BACKGROUND OF THE INVENTION

A V-belt continuously variable transmission and a toroidal continuously variable transmission for a vehicle are generally controlled so that a real drive ratio of the transmission follows a target drive ratio calculated from the throttle opening of the engine and the vehicle speed.

As a result, when a driver depresses an accelerator pedal to accelerate the vehicle, the target drive ratio increases, that is, varies toward the low speed side, and the transmission performs a shift-down.

When the driver returns the accelerator pedal, the target drive ratio decreases, i.e. varies toward the high speed side, and the transmission performs a shift-up.

Tokkai Hei 7-172217 published in 1995 by the Japanese Patent Office discloses a vehicle with an automatic transmission in which the engine output and the drive ratio are controlled so that the vehicle drive force coincides with a target value.

The engine and transmission are controlled in such a way that when the accelerator pedal is depressed by a small amount, continuity of drive force is emphasized, and when the accelerator pedal is depressed by a large amount, obtaining a large drive force is emphasized.

However, this prior art is not necessarily effective in economizing the fuel consumption of the engine.

Further, the prior art has the premise that the transmission is a planetary gear type automatic transmission wherein the drive ratio varies in a stepwise manner. In the aforesaid continuously variable transmission, however, the drive ratio varies continuously by nature, so specific control to maintain the continuity of drive force is not necessary.

SUMMARY OF THE INVENTION

It is therefore an object of this invention to control drive force of a vehicle where a continuously variable transmission is installed, so as to economize the fuel consumption of the engine while maintaining the drive force of the vehicle.

In order to achieve the above object, this invention provides a drive force control device for use with such a vehicle provided with an accelerator pedal, an engine comprising a throttle which responds to the accelerator pedal, a drive shaft and a continuously variable transmission which varies a rotation speed of the engine at an arbitrary drive ratio. The transmission has an input shaft joined to the engine and an output shaft joined to the drive shaft.

The device comprises a sensor for detecting a vehicle speed, a sensor for detecting a depression degree of the accelerator pedal, a sensor for detecting a rotation speed of the output shaft, and a microprocessor programmed to calculate a required drive shaft drive torque from the vehicle speed and the depression degree of the accelerator pedal, calculate a target input shaft rotation speed to achieve the required drive shaft drive torque with the least fuel consumption of the engine based on the vehicle speed, control the continuously variable transmission so that the rotation speed of the input shaft is equal to the target input shaft rotation speed, calculate a target engine output torque required to generate the required drive shaft drive torque, and control the throttle so that the output torque of the engine is equal to the target engine output torque.

It is preferable that the device further comprises a sensor for detecting a rotation speed of the drive shaft, wherein the microprocessor is further programmed to calculate a drive shaft target drive ratio by dividing the target input shaft rotation speed by the drive shaft rotation speed, and to calculate the target engine output torque by dividing the required drive shaft drive torque by the drive shaft target drive ratio.

When the vehicle further comprises a final gear set connecting the output shaft and the drive shaft, it is preferable that the device further comprises a sensor for detecting the rotation speed of the output shaft, and the microprocessor is further programmed to calculate the transmission target drive ratio by dividing the target input shaft rotation speed by the output shaft rotation speed, calculate the transmission target output torque by dividing the required drive shaft drive torque by a gear ratio of the final gear set, and calculate the target engine output torque by dividing the transmission target output torque by the transmission target drive ratio.

It is further preferable that the microprocessor is further programmed to limit the target input shaft rotation speed to a predetermined range, and calculate the transmission target drive ratio based on the target input shaft rotation speed after limiting.

It is also preferable that the device further comprises a sensor for detecting a rotation speed of the input shaft and a sensor for detecting a rotation speed of the drive shaft, wherein the microprocessor is further programmed to calculate a drive shaft real drive ratio by dividing the input shaft rotation speed by the drive shaft rotation speed, and calculate the target engine output torque by dividing the required drive shaft drive torque by the drive shaft real drive ratio.

When the vehicle comprises a final gear set connecting the output shaft and a drive shaft, it is preferable that the device further comprises a sensor for detecting a rotation speed of the input shaft and a sensor for detecting a rotation speed of the output shaft, and the microprocessor is further programmed to calculate the transmission real drive ratio by dividing the target input shaft rotation speed by the output shaft rotation speed, calculate the transmission target output torque by dividing the required drive shaft drive torque by a gear ratio of the final gear set, and calculate the target engine output torque by dividing the transmission target output torque by the transmission real drive ratio.

It is also preferable that the microprocessor comprises a map specifying the target input shaft rotation speed corresponding to a combination of the vehicle speed and the required drive shaft drive torque.

In this case, it is further preferable that the target input shaft rotation speed is determined within a region defined by a predetermined maximum target input shaft rotation speed and minimum target input shaft rotation speed a predetermined maximum transmission drive ratio and minimum transmission drive ratio, and a predetermined maximum vehicle speed.

The details as well as other features and advantages of this invention are set forth in the remainder of the specification and are shown in the accompanying drawings.

DESCRIPTION OF THE PREFERRED EMBODIMENTS

Figure 1:
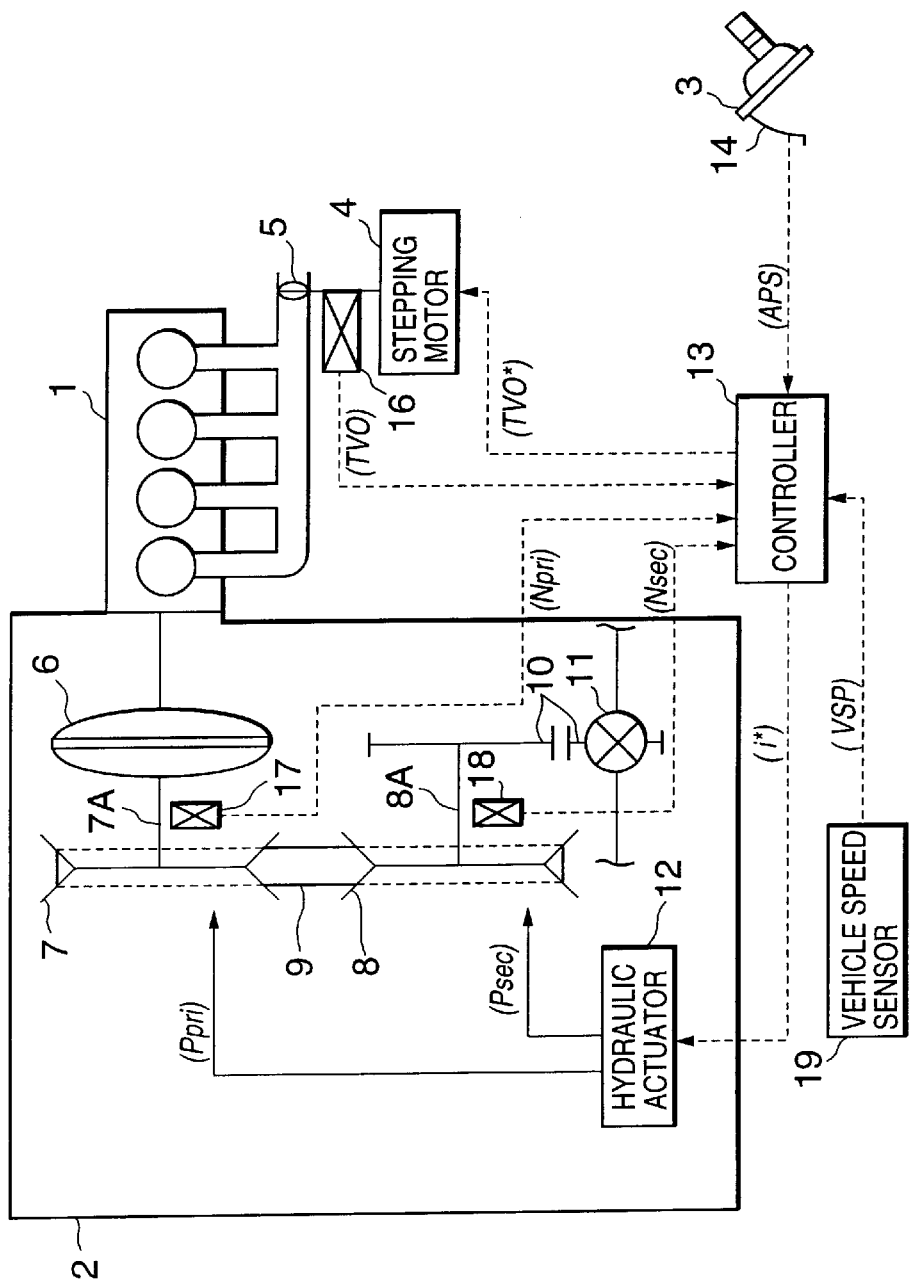
FIG. 1 is a schematic diagram of a drive force control device according to this invention.

Referring to FIG. 1 of the drawings, an engine 1 of a vehicle is connected to a V-belt continuously variable transmission 2 via a torque converter 6.

An output shaft of the V-belt continuously variable transmission 2 is joined to drive wheels of the vehicle via drive shafts. A final gear set 10 and a differential gear set 11 are interposed between the output shaft of the transmission 2 and the drive shafts.

The engine 1 is provided with a throttle 5 which increases and decreases an intake air quantity.

The throttle 5 is an electronic throttle not directly connected to an accelerator pedal 3 which a driver operates. It is driven by a stepping motor 4.

The stepping motor 4 opens and closes the throttle 5 to a target throttle opening TV0* according to a command signal from a controller 13.

A depression degree of the accelerator pedal 3 is detected by an accelerator depression sensor 14, and is input as a signal to the controller 13.

The throttle opening TV0 is detected by a throttle sensor 16, and input as a signal to the controller 13.

The continuously variable transmission 2 is provided with a primary pulley 7, secondary pulley 8 and V-belt 9 looped around their pulley grooves having a V-shaped section. The primary pulley 7 is joined to the torque converter 6 via an input shaft 7A.

The secondary pulley 8 is joined to the final gear set 10 via an output shaft 8A.

An oil pressure Ppri supplied by an actuator 12 acts on the primary pulley 7. An oil pressure Psec supplied by the actuator 12 acts on the secondary pulley 8.

The pulleys 7, 8 vary the width of the groove with V-shaped section in proportion to the oil pressure, and the drive ratio is varied continuously by increasing and decreasing the contact radius between the V-belt and the pulleys.

The actuator 12 varies oil pressure Ppri and Psec so that the real drive ratio corresponds to a target drive ratio i*output by the controller 13.

A rotation speed Npri of the primary pulley 7 is detected by a rotation. speed sensor 17, and input as a signal to the controller 13. A rotation speed Nsec of the secondary pulley 8 is detected by a rotation speed sensor 18, and input as a signal to the controller.

In addition, a signal from a speed sensor 19 which detects a vehicle speed VSP is input to the controller 13.

The controller 13 comprises a microcomputer comprising a central operation unit (CPU), a read-only memory (ROM), a random-access memory (RAM), and an I/O Interface.

The controller 13 calculates a target throttle opening TV0* and the target drive ratio i* based on the aforesaid input signals. The throttle opening of the engine 1 and the drive ratio of the continuously variable transmission 2 are controlled by outputting corresponding signals to the stepping motor 4 and actuator 12.

Next, the details of this control will be described referring to FIGS. 2, 3, and 12–14.

Figure 2:
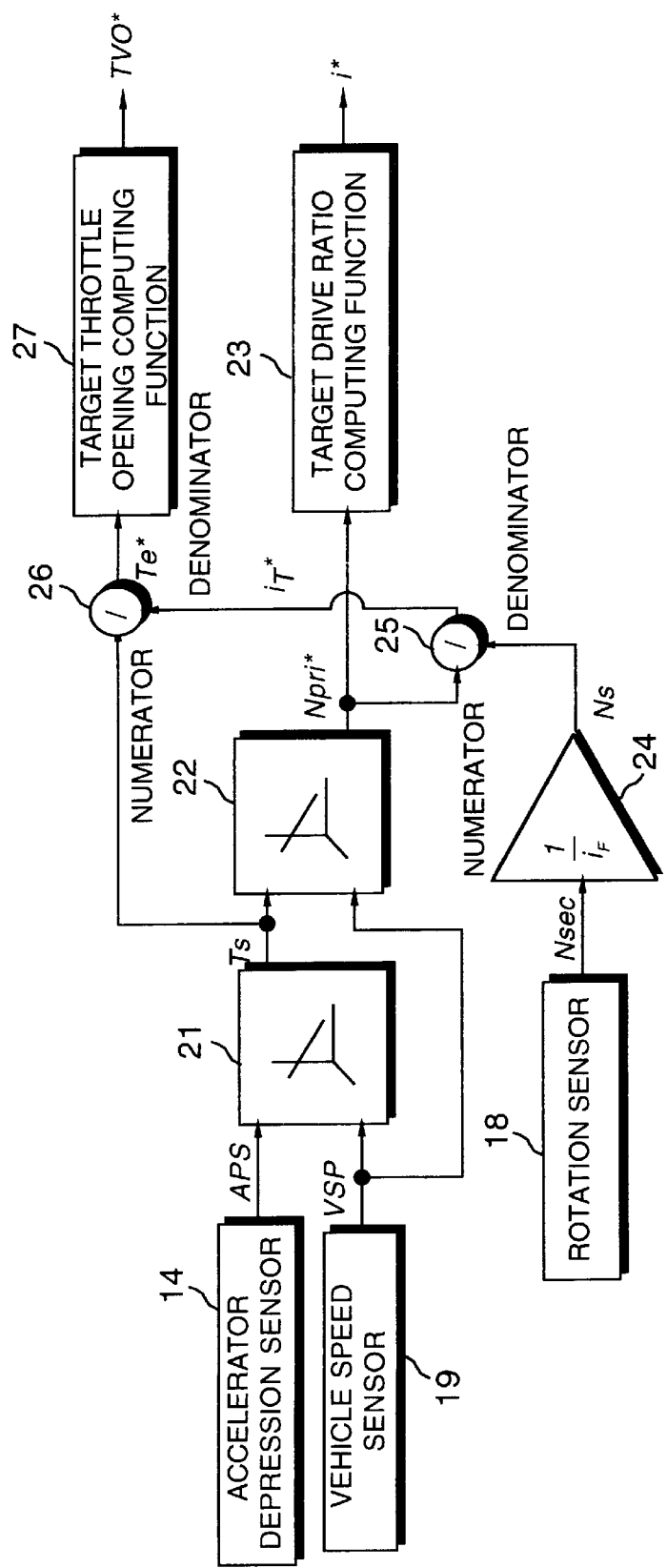
FIG. 2 is a block diagram describing the function of a controller according to this invention.

The controller 13 is provided with a required drive shaft drive torque computing function 21, target transmission input rotation speed computing function 22, target drive ratio computing function 23, drive shaft rotation speed computing function 24, drive shaft drive ratio computing function 25, target engine output computing function 26, and target throttle opening computing function 27 as shown by FIG. 2.

The required drive shaft drive torque computing function 21 is a function for calculating a required drive torque Ts for driving the drive shaft corresponding to the operating state of the vehicle based on an accelerator depression degree APS and vehicle speed VSP.

This calculation method is known from, for example, Tokkai Hei No.7-172217 of the prior art.

The target transmission input rotation speed computing function 22 calculates, from the required drive torque Ts and vehicle speed VSP, a target engine rotation speed Ne* to achieve the required vehicle shaft drive torque Ts at the present vehicle speed VSP with minimum fuel consumption.

Figure 12:
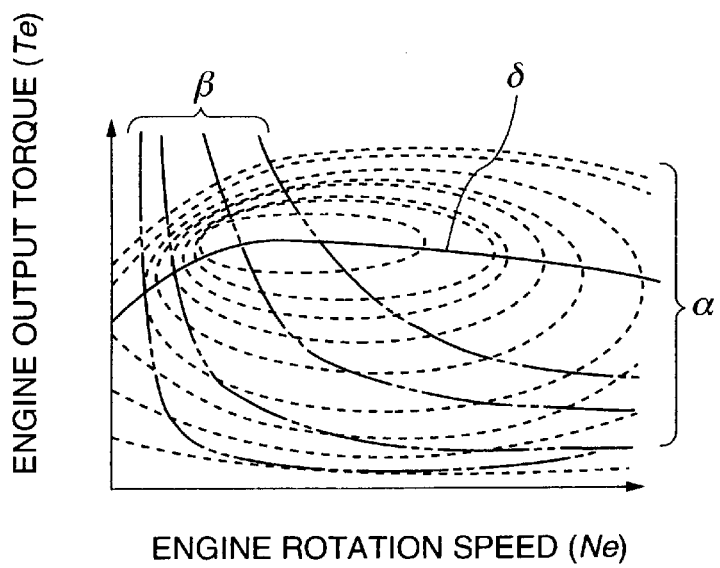
FIG. 12 is a diagram showing the characteristics of an engine.
Figure 14:
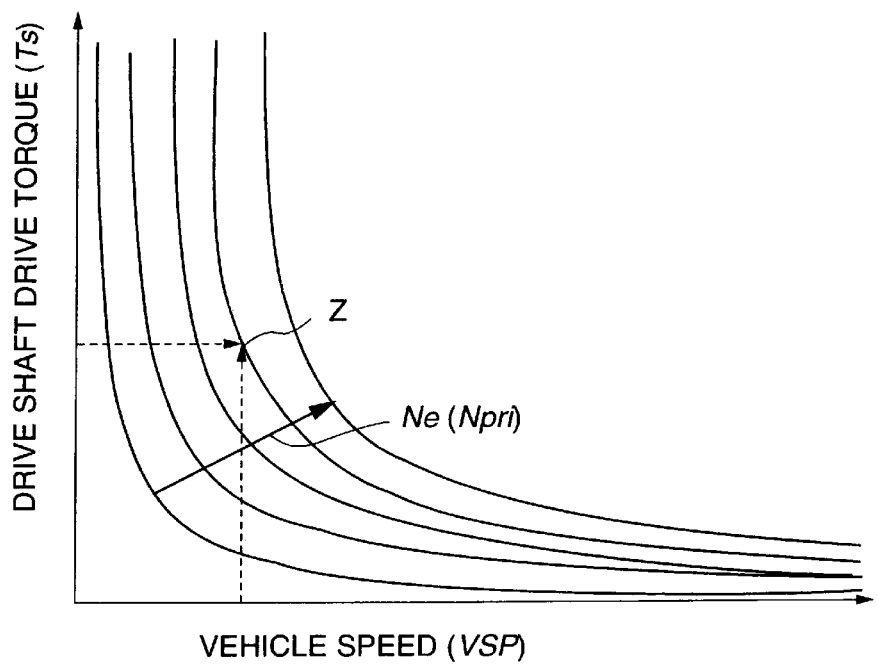
FIG. 14 is a diagram showing curves joining points for various drive ratios in the diagram of FIG. 13, corresponding to several engine rotation speeds.

This calculation is performed referring to a map shown in FIG. 14. This map is found from the diagram shown in FIG. 12. The diagram of FIG. 12 shows a relation between the engine rotation speed Ne and engine output torque Te.

In this diagram, equivalent fuel consumption lines α, represented by broken lines, show the relation when the engine fuel consumption is fixed at a constant value, and equivalent horsepower lines β, represented by double dotted lines, show the relation when the engine horsepower is fixed at a constant value.

On the equivalent horsepower lines β, a curve joining points of minimum fuel consumption is a minimum fuel consumption line δ, which is represented by a solid line.

Figure 13:
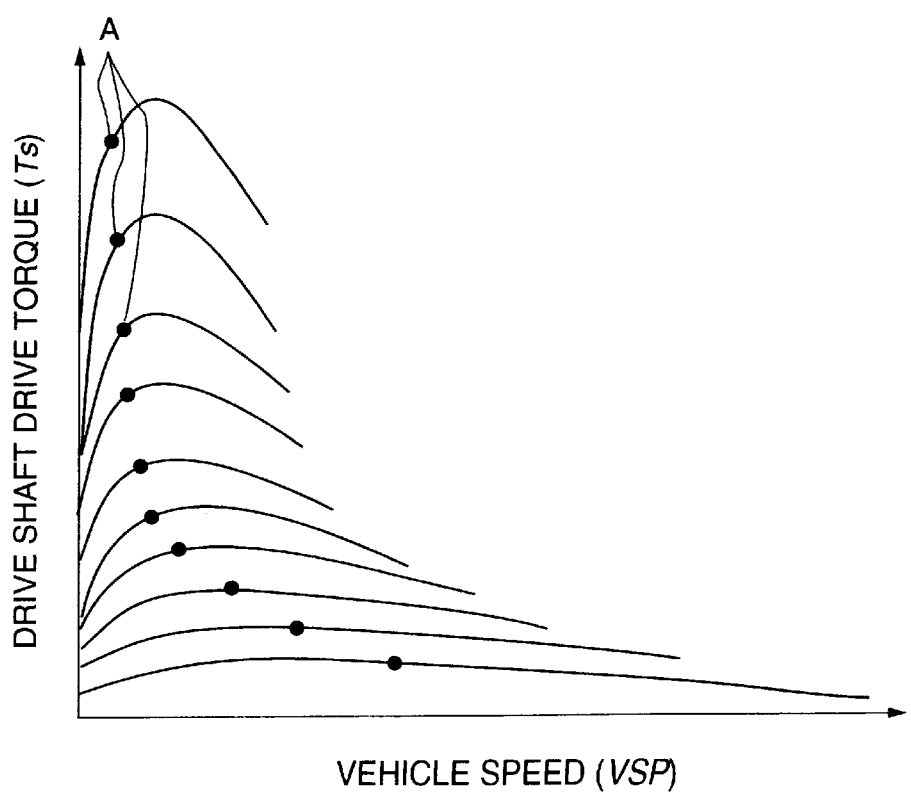
FIG. 13 is a diagram showing a relation between a vehicle speed and vehicle shaft drive force to achieve the lowest fuel consumption for various drive ratios.

The curve shown in FIG. 13 is obtained by converting the engine rotation speed Ne to the vehicle speed VSP at a fixed drive ratio, converting the engine output torque Te to the drive shaft drive torque Ts, and expressing the minimum fuel consumption line δ for each drive ratio.

In addition, the points A are points on these curves correspoending to a fixed engine rotation speed Ne.

The diagram of FIG. 14 shows curves joining these points A for various engine rotation speeds Ne.

In this diagram, the engine rotation speed Ne to achieve the required vehicle shaft drive torque Ts and vehicle speed are shown.

VSP for the minimum fuel consumption is obtained as shown for example by the point Z.

In a vehicle where the continuously variable transmission 2 is installed, the torque converter 6 is in a lockup state for most of the time that torque is transmitted.

In this case, the transmission input rotation speed Npri is identical to the engine rotation speed Ne.

Therefore, the transmission target input rotation speed Npri* can be calculated by the target transmission input rotation speed computing function 22 by looking up a map corresponding to FIG. 14.

The target drive ratio computing function 23 divides the transmission target input rotation speed Npri* calculated by the transmission input rotation speed computing function 22 by the transmission output rotation speed Nsec, calculates a target drive ratio i*, and outputs a corresponding speed change command signal to the actuator 12.

On the other hand, the drive shaft rotation speed computing function 24 divides the rotation speed Nsec detected by the rotation speed sensor 18, by a gear ratio $i_F$ of the final drive gear set 10 to calculate the drive shaft rotation speed Ns.

The drive shaft target drive ratio computing function 25 divides the transmission target input rotation speed Npri* by the vehicle shaft rotation speed Ns to calculate the drive shaft target drive ratio $i_T{}^*$.

In addition, the target engine output computing function 26 divides the required drive shaft drive torque Ts calculated by the required drive shaft drive torque computing function 21, by the drive shaft target drive ratio $i_T{}^*$ to calculate a target engine output torque Te*.

The target throttle opening computing function 27 converts the target engine output torque Te* to a target throttle opening TV0*, and outputs a corresponding signal to the step motor 4.

Figure 3:
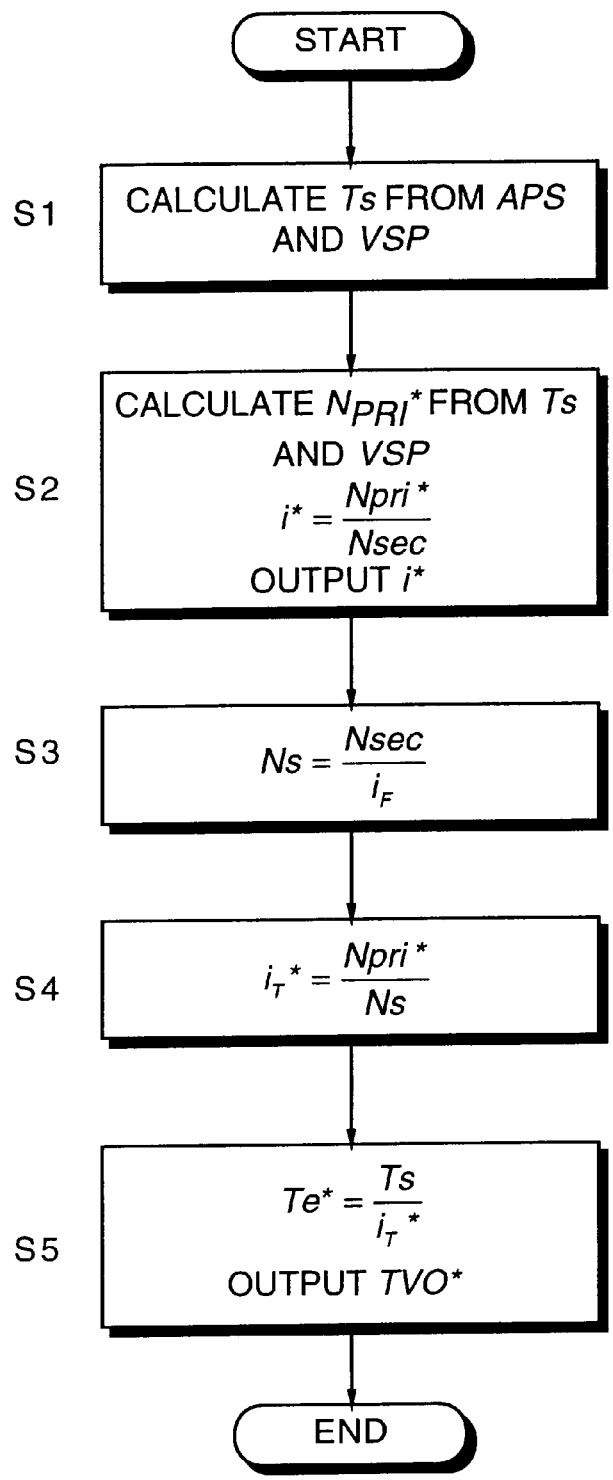
FIG. 3 is a flowchart describing a process for controlling a drive ratio and throttle opening performed by the controller.

Next, the process performed by the controller 13 will be described referring to the flowchart of FIG. 3.

First, in a step S1, the required drive shaft drive torque Ts is calculated from the accelerator depression degree APS and vehicle speed VSP.

In a step S2, the transmission target input rotation speed Npri* is calculated from the map shown in FIG. 14 based on the required drive shaft drive torque Ts and vehicle speed VSP.

In addition, this value is divided by the transmission output rotation speed Nsec to calculate the target drive ratio i*, and a corresponding speed change command signal is output.

In a step S3, the transmission target input rotation speed Npri* is divided by the gear ratio $i_F$ of the final drive gear set 10 to calculate the vehicle shaft rotation speed Ns.

In a step S4, the transmission target input rotation speed Npri* is divided by the drive shaft rotation speed Ns to calculate the drive shaft target drive ratio $i_T{}^*$.

In a step S5, the required drive shaft drive torque Ts is divided by the drive shaft target drive ratio $i_T{}^*$ to calculate the engine output torque Te*, and a corresponding throttle opening signal is output.

Due to the aforesaid control of the drive ratio and throttle opening by the controller 13, a combination of engine output torque and drive ratio which generates the required drive shaft drive torque Ts at the lowest fuel consumption, is selected.

Therefore, in a vehicle equipped with a continuously variable transmission, the required vehicle drive force can be ensured while suppressing fuel consumption at a low level.

Figure 4:
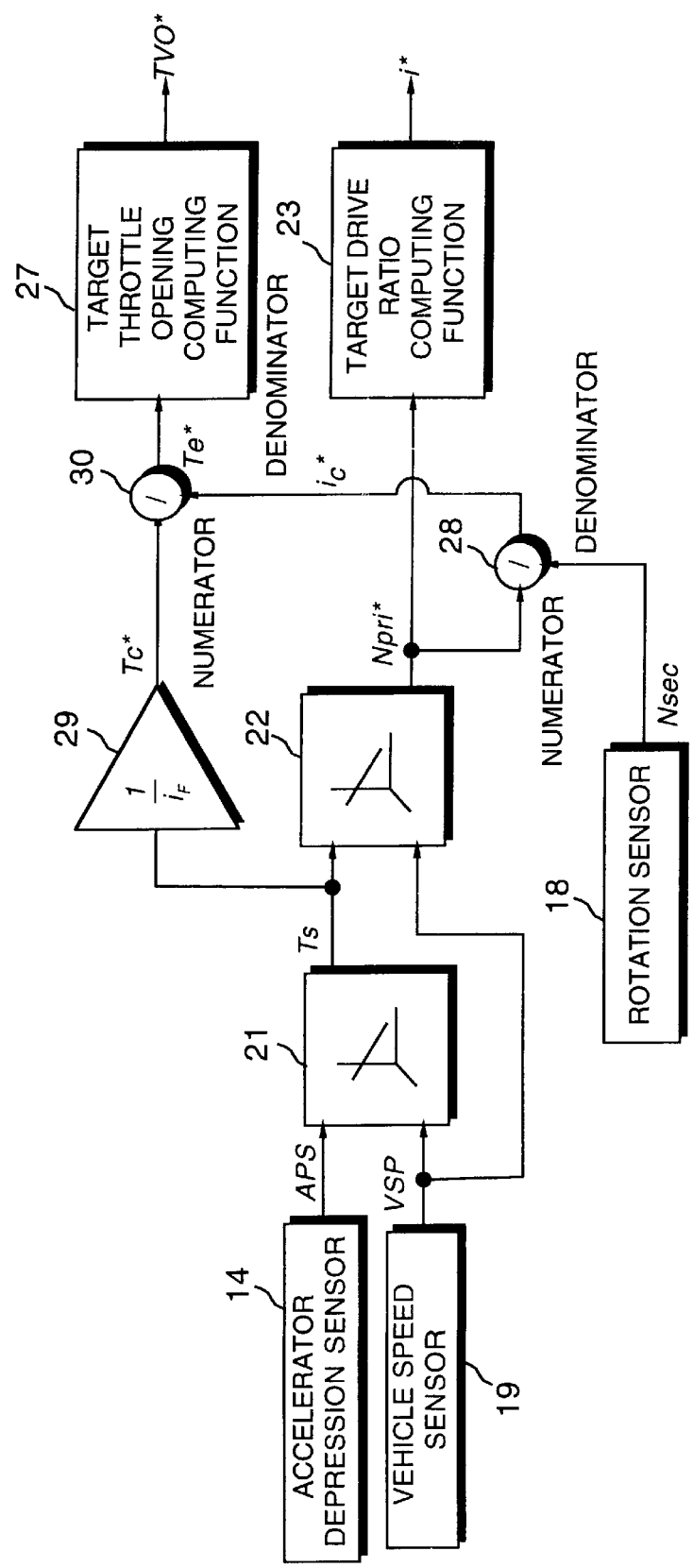
FIG. 4 is similar to FIG. 2, but showing a second embodiment of this invention.
Figure 5:
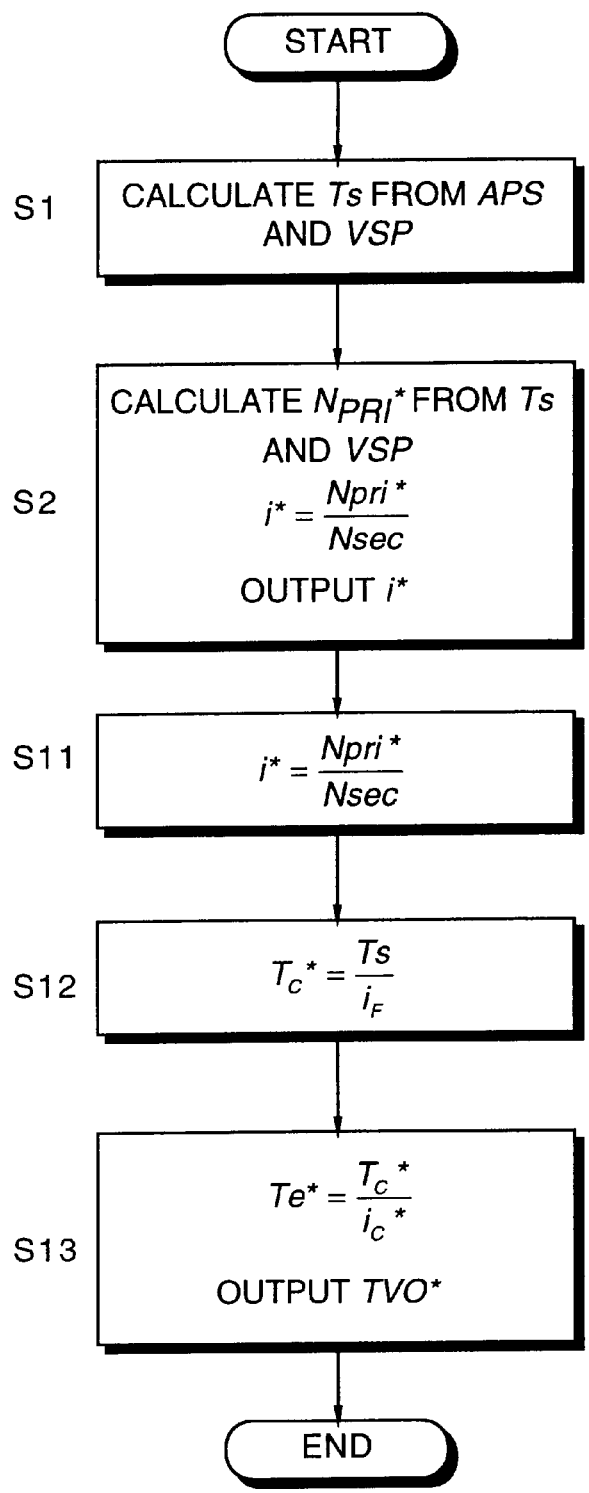
FIG. 5 is similar to FIG. 3, but showing the second embodiment of this invention.

FIGS. 4 and 5 show a second embodiment of this invention. Herein, the target engine output Te* is calculated by a different method from the aforesaid first embodiment.

First, the transmission target drive ratio computing function 28 divides the transmission target input rotation speed Npri* calculated by the target transmission input rotation speed computing function 22 by the rotation speed Nsec of the secondary pulley to calculate a transmission target drive ratio$_C{}^*$.

The transmission target output torque computing function 29 divides the required drive shaft drive torque Ts calculated by the required drive shaft drive torque computing function 21 by the gear ratio $i_F$ of the final drive gear set 10 to calculate a transmission target output torque $T_C{}^*$.

The target engine output torque computing function 30 divides the transmission target output torque $T_C{}^*$ by the target drive ratio $i_C$ to calculate the target engine output torque Te*.

Referring to the flowchart of FIG. 5, in this embodiment, steps S3–S5 of the first embodiment are replaced by steps S11–S13.

The step S11 is equivalent to the transmission target drive ratio computing function 28, the step S12 correspond to the transmission target output computing function 29, and the step S13 is equivalent to the target engine output torque computing function 30.

Figure 6:
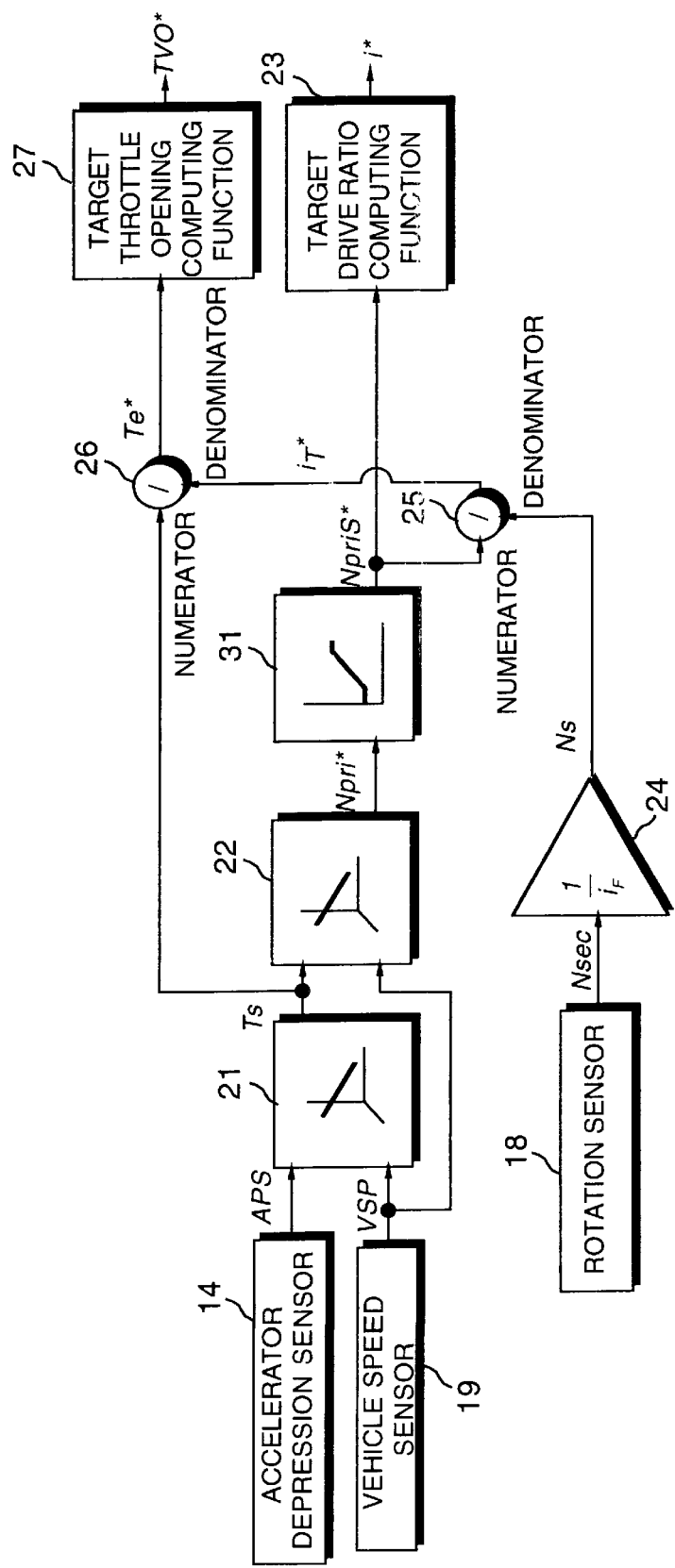
FIG. 6 is similar to FIG. 2, but showing a third embodiment of this invention.
Figure 7:
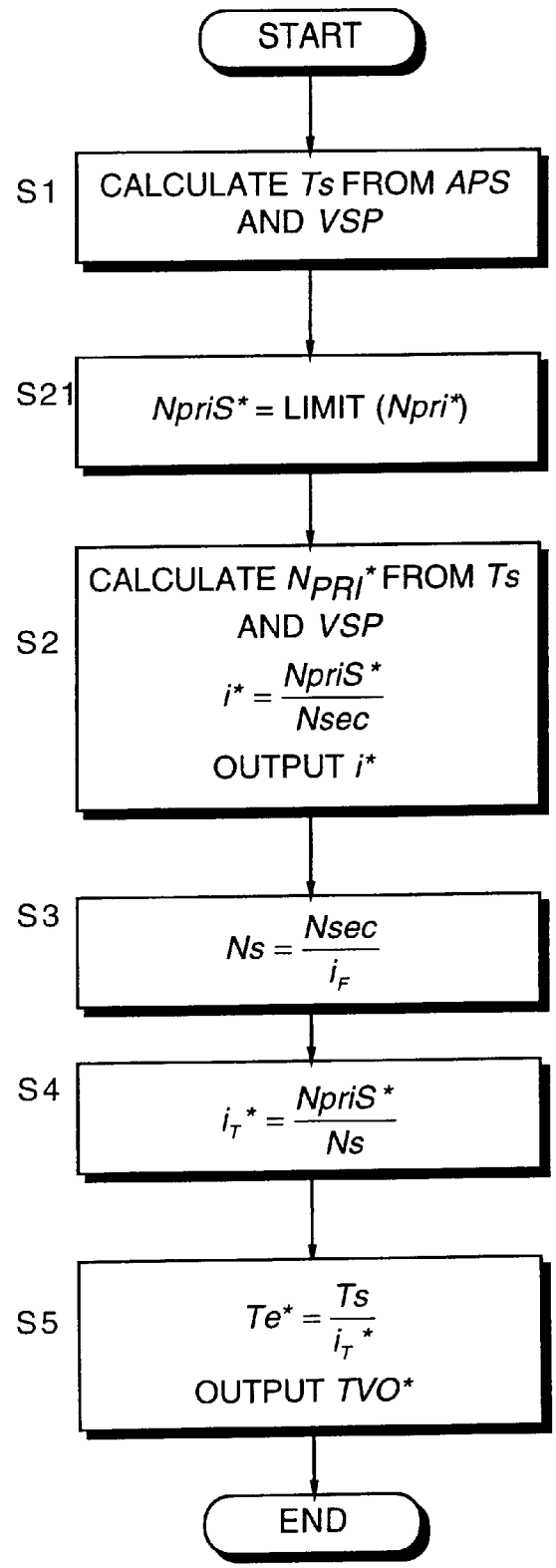
FIG. 7 is similar to FIG. 3, but showing the third embodiment of this invention.

FIGS. 6 and 7 show a third embodiment of this invention.

In the aforesaid first and second embodiments, the transmission target input rotation speed Npri* was used in the calculation of the target engine output torque Te*.

The transmission target input rotation speed Npri* may be limited depending on the drive ratio control, and $i_F$ a calculation value Npri* which is not limited is used to calculate the target engine output torque Te*, an error may arise.

Therefore, according to this embodiment, a target input rotation speed limiter 31 adds a limitation to the transmission target input rotation speed Npri*.

In the flowchart of FIG. 7, a step S21 is provided for this purpose.

Thus, by calculating the target engine output torque Te* based on a limited transmission target input rotation speed NpriS*, the aforesaid error can be excluded.

Figure 8:
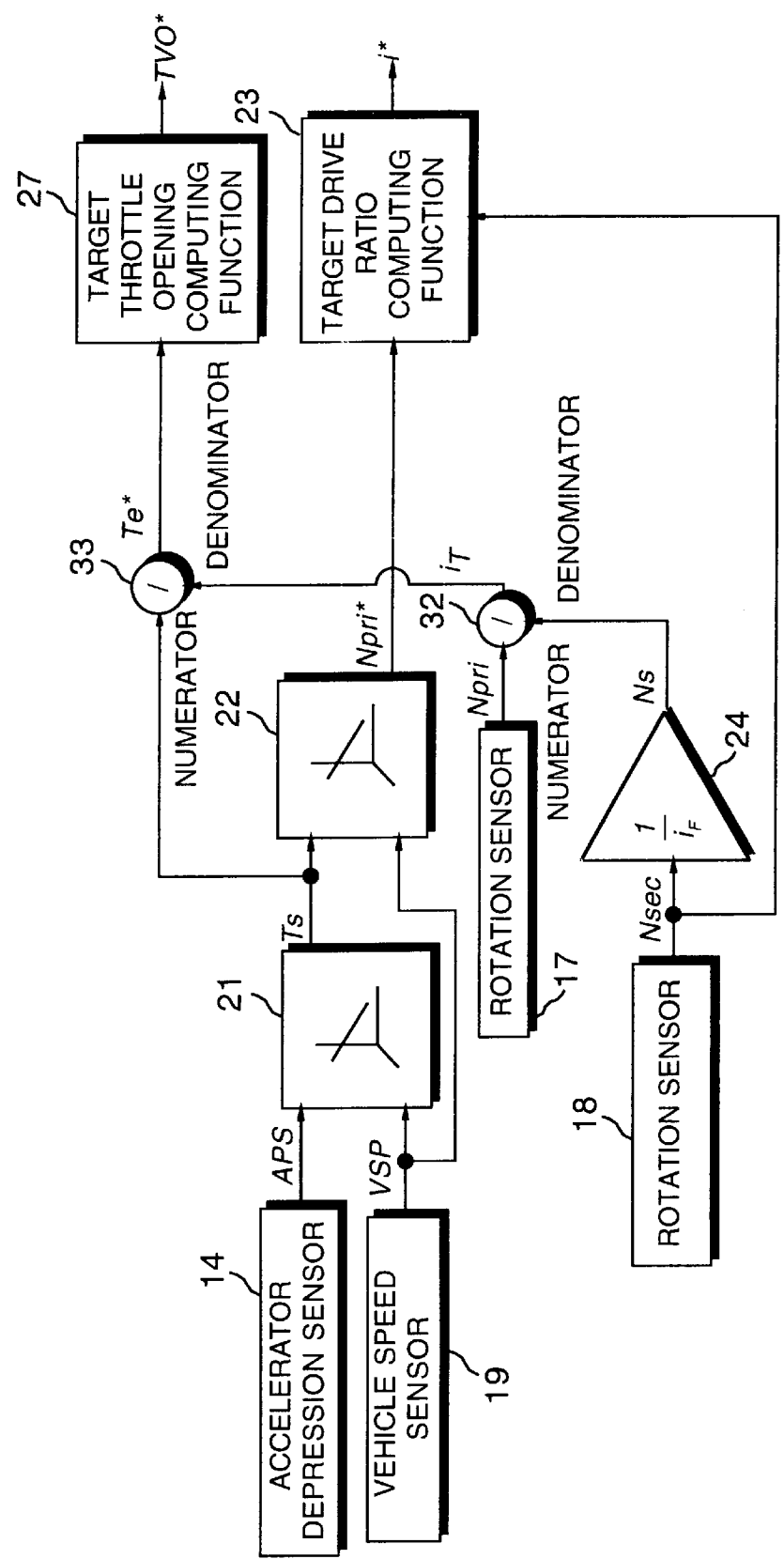
FIG. 8 is similar to FIG. 2, but showing a fourth embodiment of this invention.
Figure 9:
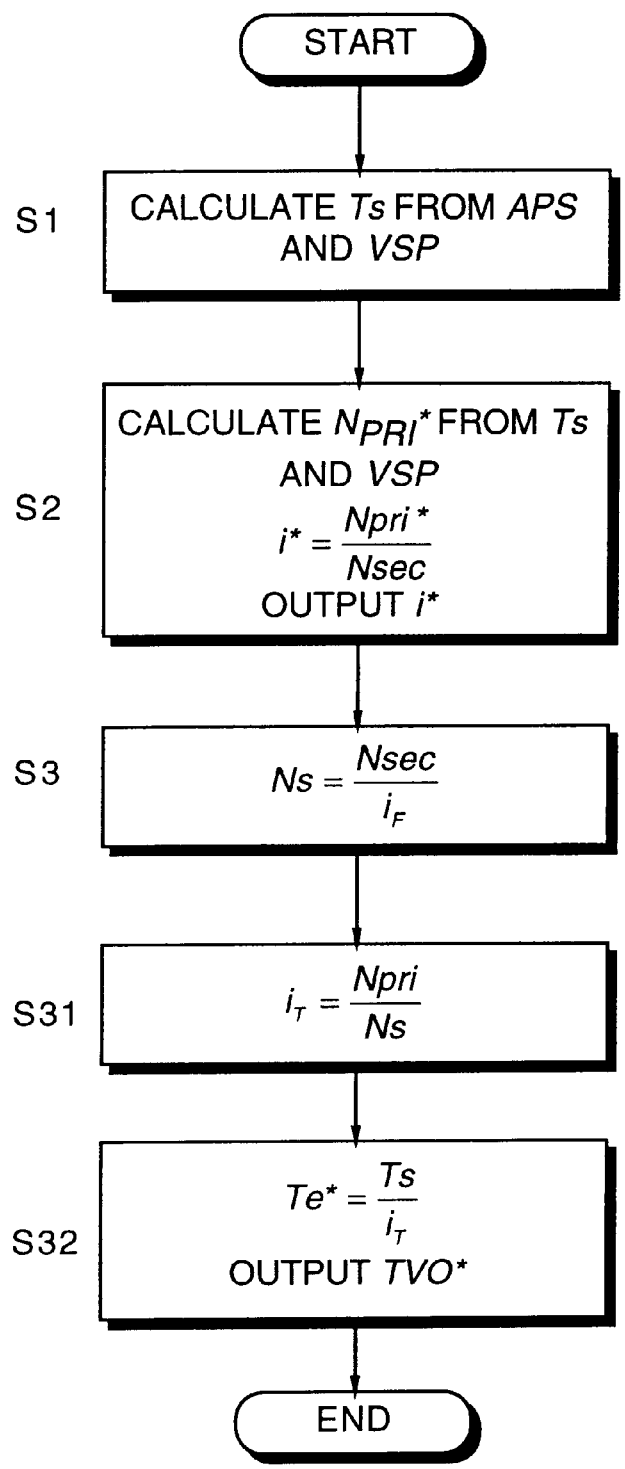
FIG. 9 is similar to FIG. 3, but showing the fourth embodiment of this invention.

FIGS. 8 and 9 show a fourth embodiment of this invention.

In this embodiment, the target engine output torque Te* is calculated by a different method to any of the methods in the first–third embodiments.

The drive shaft drive ratio computing function 32 shown in FIG. 8 divides the rotation speed Npri of the primary pulley 7, detected by the rotation speed sensor 17, by the drive shaft rotation speed Ns calculated by the rotation speed computing function 24 so as to calculate a drive shaft real drive ratio $i_T$.

The target engine output computing function 33 calculates the target engine output torque Te* by dividing the required drive shaft drive torque Ts, calculated by the required drive shaft drive torque computing function 21, by the drive shaft real drive ratio $i_T$.

In the flowchart of FIG. 9, a step S31 is equivalent to the drive shaft drive ratio computing function 32, and a step S32 is equivalent to the target engine output computing function 33.

Figure 10:
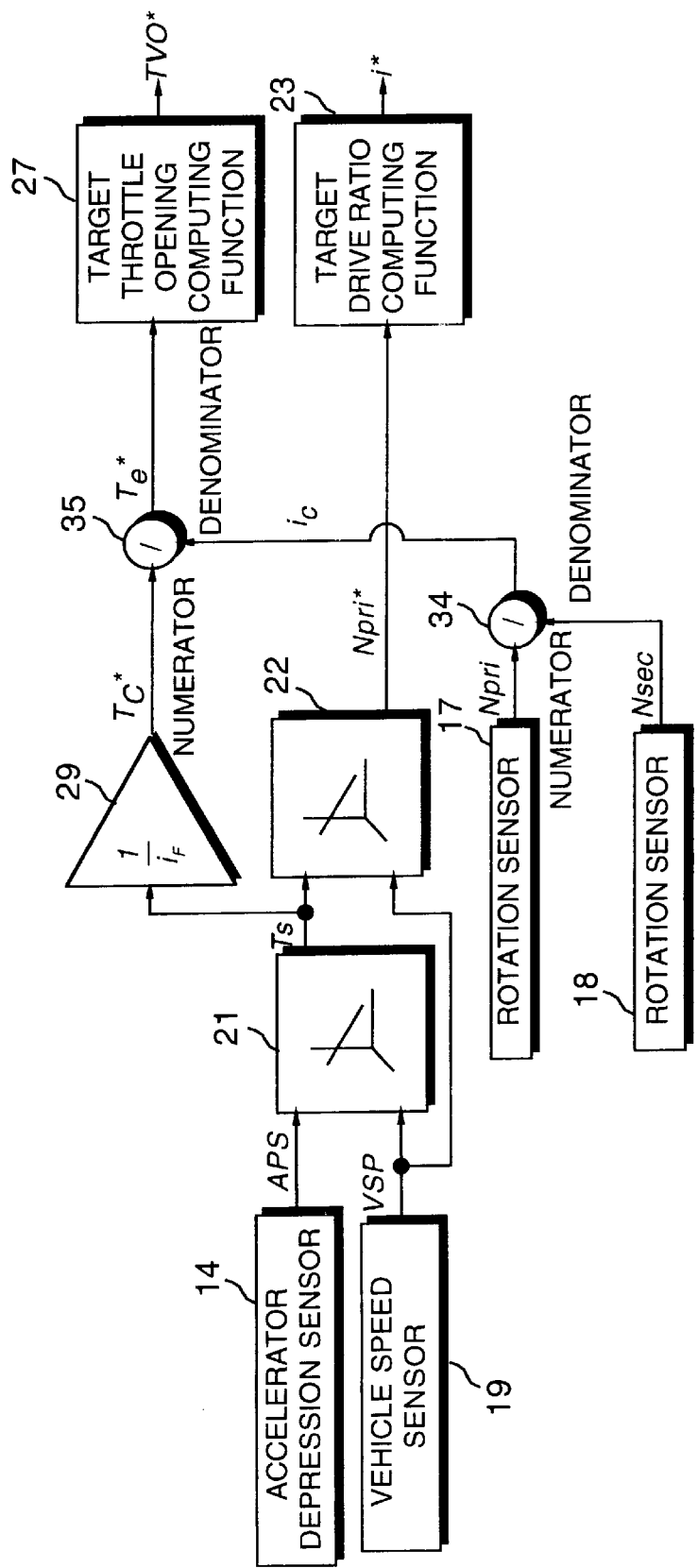
FIG. 10 is similar to FIG. 2, but showing a fifth embodiment of this invention.
Figure 11:
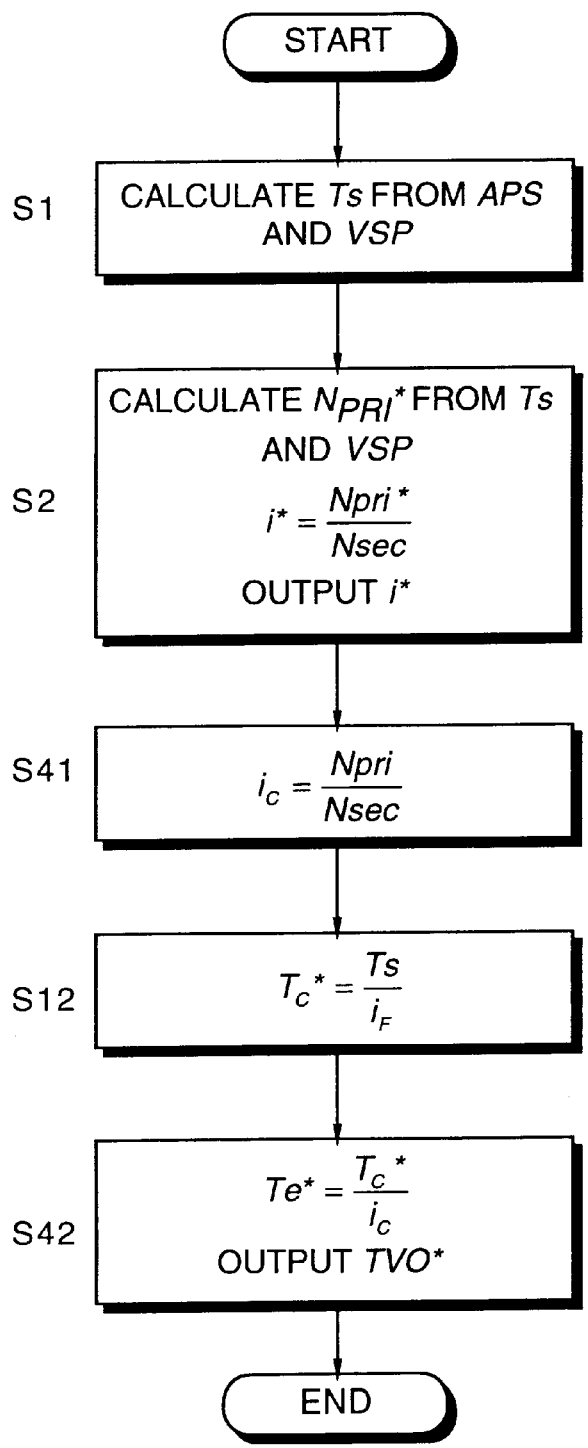
FIG. 11 is similar to FIG. 3, but showing the fifth embodiment of this invention.

FIGS. 10 and 11 show a fifth embodiment of this invention.

In this embodiment, the target engine output torque Te* is calculated by a different method to any of the methods in the first–fourth embodiments.

The transmission real drive ratio computing function 34 shown in FIG. 10 divides the rotation speed Npri of the primary pulley 7 detected by the rotation speed sensor 17, by the rotation speed Nsec of the secondary pulley 8 detected by the rotation speed sensor 18 to calculate a transmission real drive ratio $i_C$.

The transmission target output torque computing function 29 divides the required drive shaft drive torque Ts calculated by the required drive shaft drive torque computing function 21, by the gear ratio $i_F$ of the final drive gear set 10 to calculate the transmission target output torque $T_C^*$ in an identical way to that of the second embodiment.

The target engine output torque computing function 35 then divides the transmission target output torque $T_C^*$ by the transmission real drive ratio $i_C$ to calculate the target engine output torque Te*.

In the flowchart of FIG. 11, the step S41 is equivalent to the transmission real drive ratio computing function 34, and the step S42 is equivalent to the target engine output torque computing function 35.

The step S12 is equivalent to the transmission target output torque computing function 29 as described for the second embodiment.

In all of the above embodiments, the transmission target input rotation speed Npri* is calculated referring to the map corresponding to FIG. 14. However, instead of FIG. 14, a map corresponding to the solid line of the diagram of FIG. 16 may also be used.

This diagram will now be described.

Figure 15:
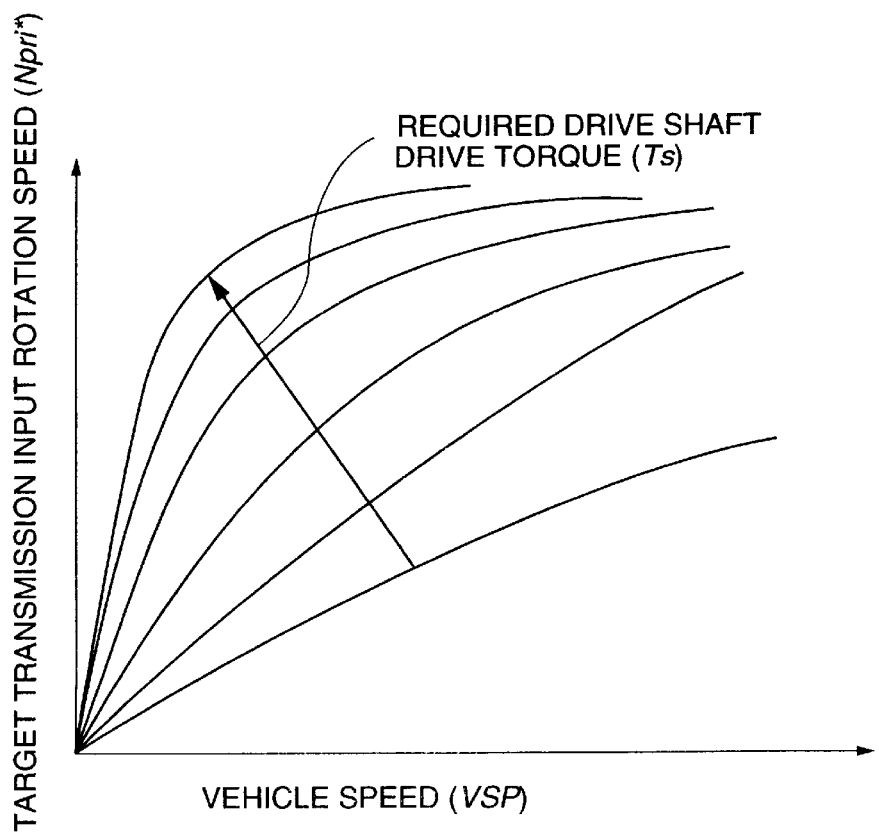
FIG. 15 is another form of the diagram of FIG. 14 in which a vehicle shaft drive force is taken as a parameter.

The relation between the vehicle speed VSP, required drive shaft drive torque Ts and transmission input rotation speed Npri in the diagram of FIG. 14, is replaced by a diagram shown in FIG. 15 wherein the transmission input rotation speed Npri (Npri*) is taken as the vertical axis, and the required drive shaft drive torque Ts is expressed as a parameter.

Figure 16:
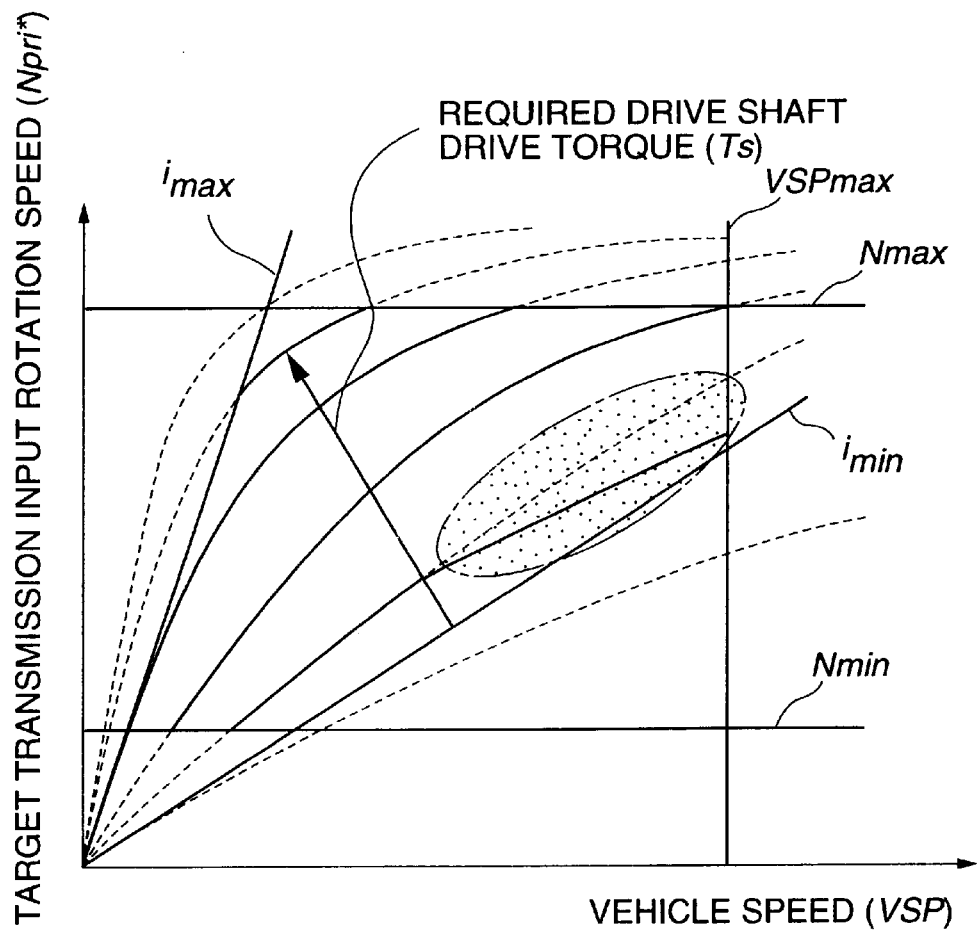
FIG. 16 is a diagram showing a drive ratio control region of a transmission based on the diagram of FIG. 15.

A maximum drive ratio $i_{max^*}$ minimum drive ratio $i_{min^*}$ highest input rotation speed $N_{max^*}$ lowest input rotation speed $N_{min}$ and highest vehicle speed $VSP_{max}$ are set relative to this diagram as shown by FIG. 16, and the region enclosed by these limiting values is set as a region where drive ratio control is applied.

The target input rotation speed Npri* is then found from the solid line in this drive ratio control region based on the vehicle speed VSP and the required drive shaft drive torque Ts.

This drive ratio control pattern is similar to the usual drive ratio control pattern except that the required drive shaft drive torque Ts is used as parameter instead of the accelerator depression degree APS.

When this map of FIG. 16 is used for the drive force control, in order to prevent noise. It is easy to exclude a specific region from the control based on lowest fuel consumption. For example, a region enclosed by the oval in the figure specified by the vehicle speed VSP and transmission target input rotation speed Npri* may be omitted from the drive ratio control region in order to prevent noise.

The corresponding structures, materials, acts, and equivalents of all means plus function elements in the claims below are intended to include any structure, material, or acts for performing the functions in combination with other claimed elements as specifically claimed.

The embodiments of this invention in which an exclusive property or privilege is claimed are defined as follows:

1. A drive force control device for use with a vehicle, said vehicle being provided with an accelerator pedal, an engine comprising a throttle which responds to the accelerator pedal, a drive shaft and a continuously variable transmission which varies a rotation speed of said engine at an arbitrary drive ratio, said transmission having an input shaft joined to said engine and an output shaft joined to said drive shaft, said device comprising:

a sensor for detecting a vehicle speed;

a sensor for detecting a depression degree of the accelerator pedal;

a sensor for detecting a rotation speed of said input shaft;

a sensor for detecting a rotation speed of said output shaft; and a microprocessor programmed to:

calculate a required drive shaft drive torque from the vehicle speed and the depression degree of the accelerator pedal, calculate a target input shaft rotation speed to achieve said required drive shaft torque with the least fuel consumption of the engine based on the vehicle speed, control said continuously variable transmission so that the rotation speed of said input shaft is equal to the target input shaft rotation speed, calculate a target engine output torque required to generate said required drive shaft drive torque, and control said throttle so that the output torque of said engine is equal to the target engine output torque.

2. A drive force control device as defined in claim 1, further comprising a sensor for detecting a rotation speed of said drive shaft, wherein said microprocessor is further programmed to calculate a drive shaft target drive ratio by dividing said target input shaft rotation speed by said drive shaft rotation speed, and to calculate said target engine output torque by dividing said required drive shaft drive torque by the drive shaft target drive ratio.

3. A drive force control device as defined in claim 1, wherein said vehicle further comprises a final gear set connecting said output shaft and the drive shaft, and said microprocessor is further programmed to calculate said transmission target drive ratio by dividing said target input shaft rotation speed by said rotation speed of said output shaft, calculate said transmission target output torque by dividing said required drive shaft drive torque by a gear ratio of said final gear set, and calculate said target engine output torque by dividing said transmission target output torque by said transmission target drive ratio.

4. A drive force control device as defined in claim 3, wherein said microprocessor is further programmed to limit said target input shaft rotation speed to a predetermined range, and calculate said transmission target drive ration based on the target input shaft rotation speed after limiting.

5. A drive force control device as defined in claim 1, further comprising a sensor for detecting a rotation speed of said drive shaft, wherein said microprocessor is further programmed to calculate a drive shaft real drive ratio by dividing said rotation speed of said input shaft by said rotation speed of said drive shaft, and calculate said target engine output torque by dividing said required drive shaft drive torque by said drive shaft real drive ratio.

6. A drive force control device as defined in claim 1, wherein said vehicle comprises a final gear set connecting said output shaft and a drive shaft, and wherein said microprocessor is further programmed to calculate:

a transmission real drive ratio by dividing said rotation speed of said input shaft by said rotation speed of said output shaft, calculate said transmission target output torque by dividing said required drive shaft drive torque by a gear ratio of said final gear set, and calculate said target engine output torque by dividing said transmission target output torque by said transmission real drive ratio.

7. A drive force control device as defined in claim 1, wherein said microprocessor comprises a map specifying said target input shaft rotation speed corresponding to a combination of said vehicle speed and said required drive shaft drive torque.

8. A drive force control device as defined in claim 7, wherein said target input shaft rotation speed is determined within a region defined by a predetermined maximum target input shaft rotation speed and minimum target input shaft rotation speed, a predetermined maximum transmission drive ratio and minimum transmission drive ratio, and a predetermined maximum vehicle speed.

9. A drive force control device for use with a vehicle, said vehicle being provided with an accelerator pedal, an engine comprising a throttle which responds to the accelerator pedal, a drive shaft and a continuously variable transmission which varies a rotation speed of said engine at an arbitrary drive ratio, said transmission having an input shaft joined to said engine and an output shaft joined to said drive shaft, said device comprising:

means for detecting a vehicle speed;

means for detecting a depression degree of the accelerator pedal;

means for detecting a rotation speed of said input shaft;

means for detecting a rotation speed of said output shaft;

means for calculating a required drive shaft drive torque from the vehicle speed and the depression degree of the accelerator pedal;

means for calculating a target input shaft rotation speed to achieve said required drive shaft drive torque with the least fuel consumption of the engine based on the vehicle speed;

means for controlling said continuously variable transmission so that the rotation speed of said input shaft is equal to the target input shaft rotation speed;

means for calculating a target engine output torque required to generate said required drive shaft drive torque; and means for controlling said throttle so that the output torque of said engine is equal to the target engine output torque.

* * * * *